(12) United States Patent
Abma (10) Patent No.: US 8,559,270 B2
(45) Date of Patent: *Oct. 15, 2013

(54) METHOD FOR SEPARATING INDEPENDENT SIMULTANEOUS SOURCES

(75) Inventor: Raymond Lee Abma, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 546 days.

This patent is subject to a terminal disclaimer.

(21) Appl. No.: 12/851,590

(22) Filed: Aug. 6, 2010

(65) Prior Publication Data

US 2010/0299070 A1 Nov. 25, 2010

Related U.S. Application Data

(63) Continuation-in-part of application No. 12/542,433, filed on Aug. 17, 2009, now Pat. No. 8,295,124.

(60) Provisional application No. 61/089,363, filed on Aug. 15, 2008, provisional application No. 61/154,613, filed on Feb. 23, 2009.

(51) Int. Cl.
*G01V 1/00* (2006.01)
*G01V 1/37* (2006.01)

(52) U.S. Cl.
CPC ... *G01V 1/00* (2013.01); *G01V 1/37* (2013.01)
USPC .............................................. 367/38; 367/50

(58) Field of Classification Search
USPC ................................... 367/38, 50–52; 702/14
See application file for complete search history.

(56) References Cited

U.S. PATENT DOCUMENTS 7,916,576 B2 * 3/2011 Beasley et al. ............... 367/38
8,295,124 B2 * 10/2012 Abma ........................... 367/38

OTHER PUBLICATIONS

PCT Notification of Transmittal of the International Search Report and the Written Opinion of the International Searching Authority, or Declaration, Mailed on Sep. 26, 2011, in related International patent application No. PCT/US2011/045362, 14 pages.
PCT International Preliminary Report on Patentability mailed on Feb. 15, 2011, in related International patent application No. PCT/US2009/054064, 7 pages.
Ozdogan Yilmaz, "Seismic Data Processing", Society of Exploration of Geophysicists, 1987, Chapter 1, pp. 9-81, Tulsa, Oklahoma, USA.
Ozdogan Yilmaz, "Seismic Data Processing", Society of Exploration of Geophysicists, 1987, Chapter 6, pp. 384-427, Tulsa, Oklahoma, USA.

* cited by examiner

*Primary Examiner* — Krystine Breier
(74) *Attorney, Agent, or Firm* — Gunnar Heinisch (57) ABSTRACT

This is a method of separating simultaneous sources that uses an inversion-type approach. Each source will preferably activated at a random time with respect to the others. These random delays tend to make the interference between sources incoherent while the reflections create coherent events within a series of shots. The shot separation is performed via a numerical inversion process that utilizes the sweeps for each shot, the start times of each shot, and the coherence of reflection events between nearby shots. Implementation of this method will allow seismic surveys to be acquired faster and cheaper.

20 Claims, 6 Drawing Sheets

METHOD FOR SEPARATING INDEPENDENT SIMULTANEOUS SOURCES

RELATED CASE

This application is a continuation-in-part of co-pending U.S. Ser. No. 12/542,433, filed Aug. 17, 2009, which claims the benefit of U.S. Provisional Patent Application Ser. No. 61/089,363 filed on Aug. 15, 2008, and U.S. Provisional Patent Application Ser. No. 61/154,613, filed Feb. 23, 2009, and incorporates said applications by reference into this disclosure as if fully set out at this point.

TECHNICAL FIELD

This invention relates to the general subject of seismic exploration and, in particular, to methods for estimating seismic and other signals that are representative of the subsurface.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is taken over the same subsurface target at two or more different times. This might be done for many reasons but often it is done to measure changes in subsurface reflectivity over time which might be caused by, for example, the progress of a fire flood, movement of a gas/oil or oil/water contact, etc. Obviously, if successive images of the subsurface are compared any changes that are observed (assuming differences in the source signature, receivers, recorders, ambient noise conditions, etc., are accounted for) will be attributable to the progress of the subsurface processes that is at work.

A seismic survey is composed of a very large number of individual seismic recordings or traces. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3-D survey are amenable to viewing in a number of different ways. First, horizontal "constant time slices" may be extracted from a stacked or unstacked seismic volume by collecting all of the digital samples that occur at the same travel time. This operation results in a horizontal 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume. It should also be noted that a 3-D dataset can be thought of as being made up of a 5-D data set that has been reduced in dimensionality by stacking it into a 3-D image. The dimensions are typically time (or depth "z"), "x" (e.g., North-South), "y" (e.g., East-West), source-receiver offset in the x direction, and source-receiver offset in the y direction. While the examples here may focus on the 2-D and 3-D cases, the extension of the process to four or five dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, one well-known problem with seismic data is that it is relatively expensive to acquire. Indeed, in some cases the cost of the survey may determine whether or not the economics of the proposed target are favorable. Thus, techniques that tend to reduce the cost of such surveys are always welcome.

Closely spaced firing of two or more sources has long been recognized as one strategy for reducing the cost of seismic data acquisition. The basic idea behind this approach is that a receiver line or patch will be deployed and that multiple sources will be sequentially activated during a single recording period. Thus, subsurface reflections from an early source excitation may be comingled with those that have been sourced later, i.e., a "blended source" survey is acquired. Note that this is in stark contrast to conventional surveying techniques, wherein the returning subsurface reflections from one source would never be allowed to overlap the reflections of another.

Although the blended source approach has the potential to dramatically reduce the time in the field, thereby reducing the cost of the survey proportionally, one obvious problem is that it can be difficult to separate the individual shots thereafter. Said another way, what is of critical importance in interpreting seismic data is the depth of each reflector. Generally speaking, depth of a reflector is determined by reference to its two-way seismic travel time. So, in a multiple source survey it is of the highest priority to determine which of the observed subsurface reflections is associated with each source, otherwise its two-wave travel time cannot be reliably determined.

In addition to planned blended source surveys, in some cases unplanned multiple source recordings may be acquired. For example, in areas of intense exploration activity there may be several crews shooting in the same general area. This is of particular concern in marine areas such as the Gulf of Mexico where multiple seismic boats may be active simultaneously. Traditionally when a seismic record contains energy from a third party source some attempt is made to surgically mute the part of the signal that contains the unwanted source so that it does not spread to adjacent records via multi-trace processing algorithms such as migration. However, such muting eliminates both the interfering noise and useful reflections that might occur at or near the same reflection time. Although it is known to try to replace the muted regions by interpolation from unmuted data, such is at best a crude approximation to the data that have been lost.

Of course, separating the two or more shots from a single seismic recording has been predictably problematic. Although others have sought to solve this problem, to date there has not been a satisfactory method of doing this.

Heretofore, as is well known in the seismic processing and seismic interpretation arts, there has been a need for a method of separating two or more seismic sources that have been activated during a single recording. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a system and method for separating multiple seismic sources that have been activated during a single seismic recording. In particular, this invention allows a user to separates sources acquired with recording of the reflectors overlapped in time. The use of more than one set of sources will allow seismic surveys to be acquired faster if the reflections resulting from the different sources can be separated. This method may be especially effective with acquisition of wide-azimuth surveys, since the kinematics of the reflectors will be significantly different for different shots, allowing the continuity of the reflections to be used in several dimensions.

In brief, the instant invention utilizes an inversion-type method to separate seismic recordings that contain multiple seismic sources (e.g., Vibroseis®, air guns, etc.) that contain overlapping reflectors. In the preferred embodiment, the sources will be initiated (e.g., fired) at random times while multiple receivers are being recorded. These random delays tend to make the interference between different sources incoherent while the reflections associated with the same source create coherent events. The separation will preferably be done with a numerical inversion process that utilizes the sweeps for each shot, the start times of each shot, and the coherence of reflection events between nearby shots. This method has the potential to allow seismic surveys to be acquired faster and cheaper than has been heretofore possible.

In one preferred embodiment, the system of equations that is to be inverted may be described as $d=\Gamma Sm$, where d is a matrix representation of the recorded seismic data, m is the set of separated reflection signals, S is the matrix or operator that describes the similarity between nearby shots, and $\Gamma$ is a matrix that defines the blending or mixing of the individual sources. The entries in the matrix S (or the operator that defines S) can be selected by any method that constrains the events in nearby shots to be similar or coherent in some sense. In some preferred embodiments the entries of S will be selected according to an algorithm that tends to attenuate signals between nearby shots. The matrix S may be designed to enhance coherence in several dimensions, depending on the geometry of the acquisition.

In still another preferred embodiment, the system of equations that is to be inverted may be described as $Wd=W\Gamma Sm$, where d is a matrix representation of the recorded seismic data, m is the set of desired reflection signals, S is the matrix describing the similarity between nearby shots, $\Gamma$ is a matrix that defines the blending or mixing of the individual sources, and W is a weight matrix that can be used, for example, to account for differences in recorded signal amplitude (e.g., to allow the amplitude of signals recovered from receivers near the source to be attenuated to match the amplitudes obtained from receivers situated further away).

In the preferred embodiment, source excitations that occur within the same recording will be separated in time by random time intervals. Recordings from shots that are so spaced will be less likely to contain coherent energy from shots that have been sourced in close time proximity, thus making them more likely to be separable thereafter. By exciting the shots at random times, when these shots are corrected to their individual time-zeros they will have signals that are coherent from source point to source point, while the interfering shots will tend to be incoherent and may be separated by the inversion process taught herein. This strengthens the operation of the coherency measures in the instant separation process.

Thus, in the preferred embodiment, the application of the instant inversion process provides reasonably clean shot gathers that may be used both for imaging and prestack analysis such as AVO (Amplitude Vs. Offset) analysis.

Of course, acquiring seismic data with shots where the recorded information from one shot overlaps in time with other shots has the potential to significantly reduce the time (and cost) required to shoot a seismic survey. This approach might also allow more closely spaced shot point intervals (e.g., during a marine survey) which could potentially provide better seismic images that would improve the chances of discovering economic quantities of oil and/or gas.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

Figure 1:
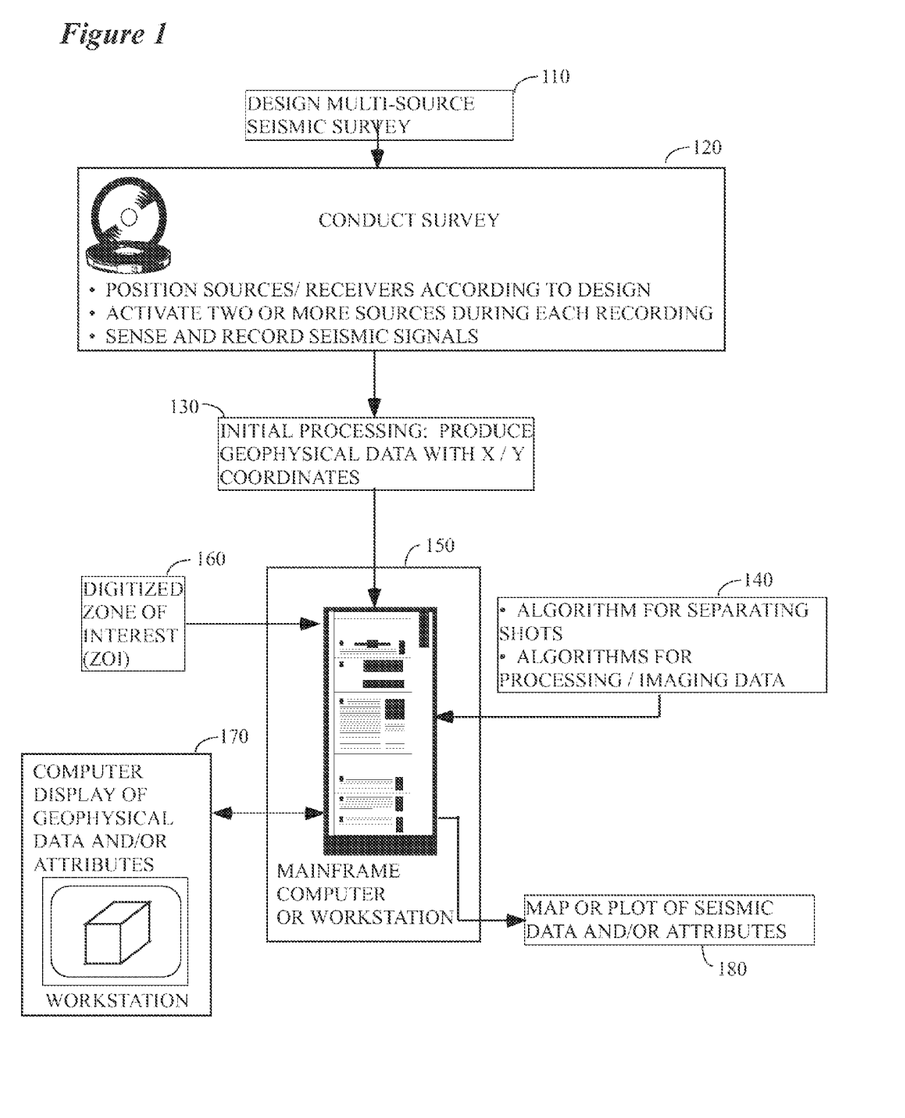
FIG. 1 illustrates the general environment of the instant invention.

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data (i.e., seismic traces) are collected in the field 120 over a subsurface target of potential economic importance and are typically sent thereafter to a processing center 150 where the traces will be subjected to various algorithms to make them more suitable for use in exploration. In some cases, there may be some amount of initial data processing performed while the data are still in the field and this is becoming more common and feasible given the computing power that is available to field crews.

In the processing center a variety of preparatory processes 130 are typically applied to the seismic traces to make them ready for use by the explorationist. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that a computer 150 suitable for use with the instant invention would typically include, in addition to mainframes, servers, and workstations, super computers and, more generally, a computer or network of computers that provide for parallel and massively parallel computations, wherein the computational load is distributed between two or more processors. As is also illustrated in FIG. 1, in the preferred arrangement some sort of digitized zone of interest model 160 may be specified by the user and provided as input to the processing computer program. In the case of a 3-D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
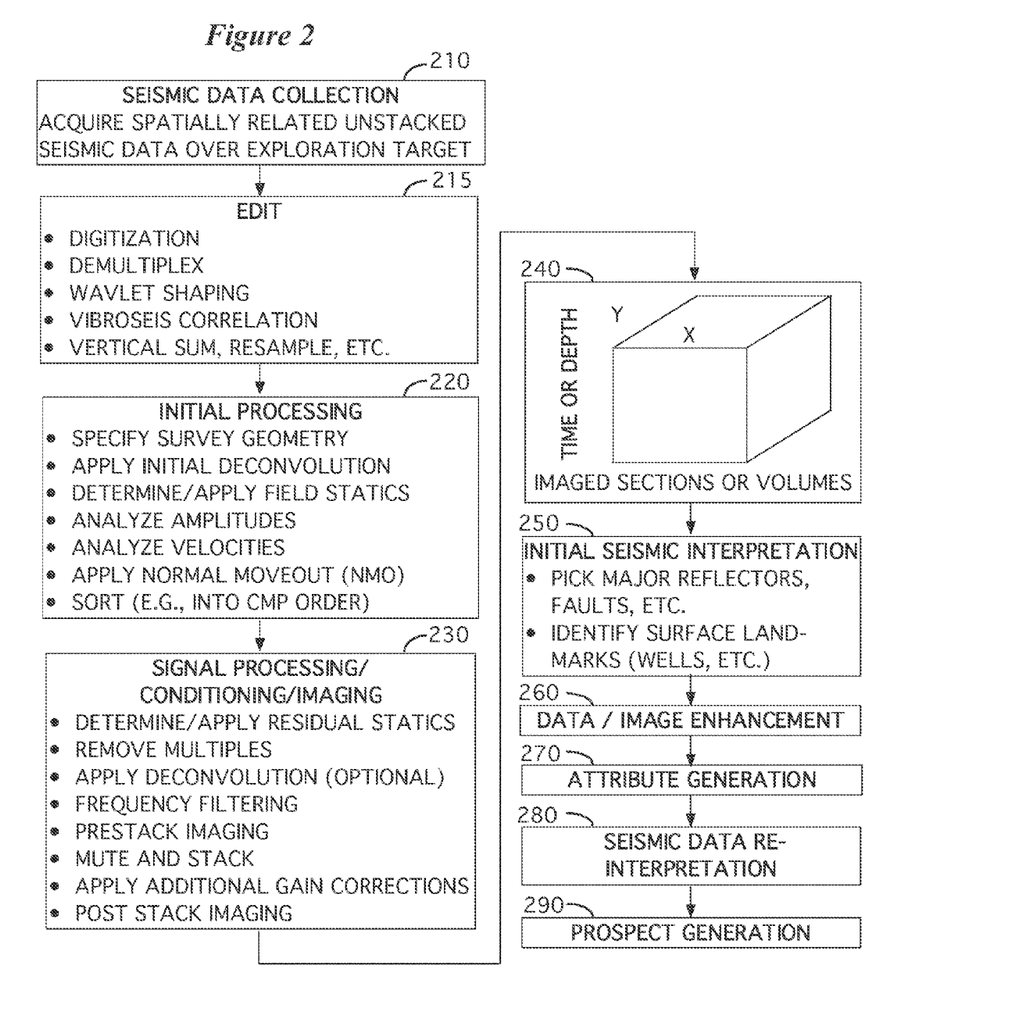
FIG. 2 illustrates a seismic processing sequence suitable for use with the instant invention.

As was indicated previously, the instant invention will preferably be made a part of and incorporated into a conventional seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2-D or 3-D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art. Note that for purposes of the instant disclosure, the seismic survey will be a blended source survey wherein reflections from a later source activation may interfere with (or coincide in time with) reflections from an earlier one. After the shots have been separated according to the instant invention, the unstacked seismic traces resulting from that operation are useable as would be any other collection of seismic traces.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3-D seismic survey or, preferably, an unstacked 3-D portion of a 3-D seismic survey. The invention disclosed herein is most effective when applied to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

In some preferred arrangements, the instant invention might best be utilized in connection with the preprocessing step 215, i.e., in conjunction with or in place of the wavelet shaping/Vibroseis® correlation steps, although it could certainly be utilized elsewhere within this generalized processing scheme.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2-D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Preferred Embodiments

According to a first preferred embodiment of the instant invention, there is provided a method of separating two or more seismic sources that have been activated during a single recording session, wherein similarity between nearby shots is used to constrain the inversion process.

Figure 3:
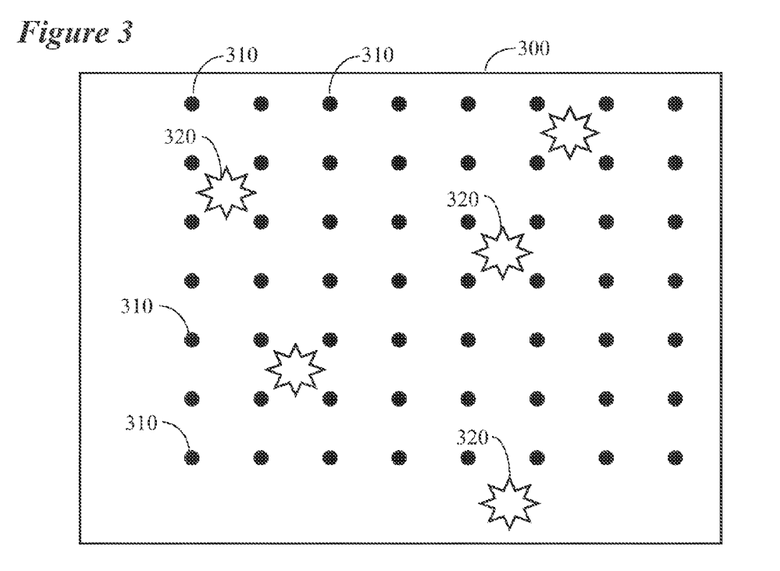
FIG. 3 contains a plan view schematic of a typical blended source survey.
Figure 4:
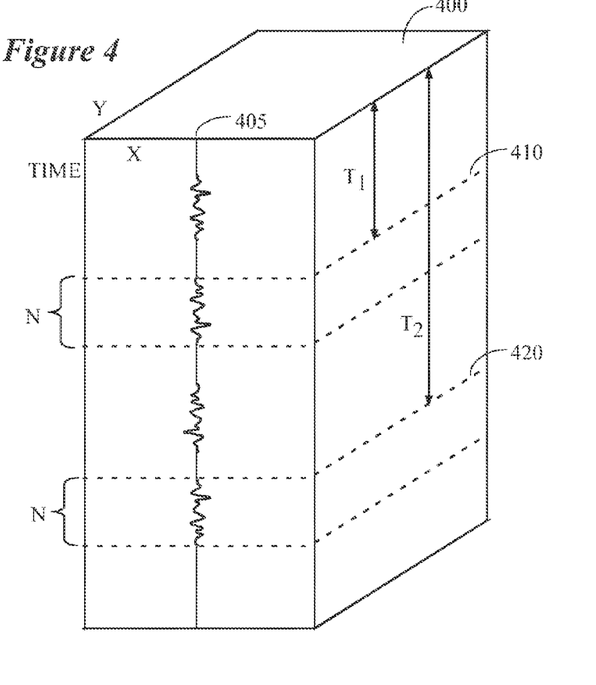
FIG. 4 illustrates schematically how different shots may be identified and extracted within the blended source survey.

Turning first to FIGS. 3 and 4, in a preferred arrangement a blended source land survey will be collected by first laying out a number of receivers 310 in a 2-D configuration over a target of exploration interest. In some preferred embodiments there may be only a few or as many as several thousand receivers 310 in the survey. The receivers 310 might be connected by cables to a central recording unit, they might use wireless transmission to same, or each receiver might contain some amount of internal data storage in which to record the seismic signals received thereby. Those of ordinary skill in the art will be quite familiar with these sorts of receiver variations.

In the preferred embodiment, the receivers 310 will be continuously recorded for an extended period of time. In some variations, the receivers might be recorded for a few hours, one-half day, a full day, multiple days, etc. The only requirement is that the recording must capture at least two source excitations. This is in contrast to the usual seismic survey, wherein the receivers are recorded for only a few seconds after the activation of a source.

During the time period that the receivers are being recorded, a number of seismic sources 320 will be activated at different locations within the survey area 300. In the preferred embodiment two or more sources will be used. In the case of a marine survey, it is likely that two sources will be used but that obviously is something that is left to the discretion of the survey designer. Further, and preferably, the source activations will be separated in time by random time periods. Still further, and preferably, the sources will be activated close enough in time that there will be some overlap or blending between the shots. That is, for example in the case of a land survey where each source 320 is a Vibroseis® unit, it is anticipated that the source activations might be separated by a few seconds in some cases. Note that FIG. 3 is not intended to suggest that each source 320 will be activated simultaneously but instead is indicated to indicate that each source is located at a different location within the survey area 300. During some surveys, ten or more different sources might be used. As an example an exploration method that would produce data that would be suitable for use with the instant invention, attention is drawn to WO 2008/025986 (PCT/GB2007/003280) "Seismic Survey Method" which names Howe as its sole inventor, which application is incorporated herein by reference as if fully set out at this point. Howe discusses the use of staggered activation of vibrator activations wherein there is some overlap in the returning subsurface reflections.

When the data are acquired in a marine setting, it is preferred that care be taken to make the time intervals between shots as random as possible. More particularly, although some amount of randomness may be introduced by shooting on position (i.e., activating the source when the boat reaches a predetermined position) since the exact arrival time at a shot point is at least somewhat random. However, this may not be a reliable way to introduce randomness into the activation times since the boat speeds tends to be relatively constant and the shot points are typically evenly spaced. That being said, shooting exclusively on position may introduce sufficient randomization when the distance between shot points is large. The randomness of the intervals between shots will preferably be controlled by the lowest frequency of interest in the survey, and the expected variation of the shots from a regular interval should be at least one or more of such wave-lengths. Thus, if the lowest frequency of interest produces a seismic wave that is on the order of 200 ms in length, preferably the shot separation should be on the order of 200 ms plus some random amount which might be, again, on the order of 200 ms or more.

Of course, one alternative (i.e., shooting strictly at predetermined times independent of the boat's actual position, that is, "shooting on time") is likely to run afoul of the imaging goals of a carefully planned survey. As a consequence, a blended approach is preferred. In some preferred embodiments, randomly spaced shot times and positions will be scheduled, with the shooting boat increasing or decreasing its speed as necessary to be at the chosen location at the assigned time. In other preferred embodiments, the boat will be shooting on position, with the shot times being monitored for randomness. In this scenario, the boat will approach a designated position and then, rather than firing exactly on position, it will add or subtract some amount of time (e.g., a randomly generated time adjustment) to the anticipated arrival time so that the boat intentionally shoots a bit early or late. The time adjustment should be chosen to ensure that the distribution of shot times are at least approximately random. Also, the random increment should be chosen so that the boat is within some specified distance tolerance of the intended shot point. Finally, the increment should be chosen such that the maximum delay does not interfere with the movement of the other sources to the next short position. This might be done, for example, by checking the delay from the last shot to assure that it is not too close to the delay between the previous shots or by keeping track of the distribution of the shot times to check for and correct non-random patterns.

Preferably the software that controls the airguns or other seismic sources will need to determine the ship's location (e.g., via GPS), its anticipated arrival time, and the time since the previous shot(s) in order to create a distribution of shot activation times (or shot time intervals) that is at least pseudo-random. Of course, in the preferred embodiment this will be done without allowing more than two shots to overlap. That being said, the instant invention is fully general and can accommodate multiple shots that overlap.

Turning next to FIG. 4, this figure suggests in a general way what the data from a blended source survey might look like. Each receiver 310 will give rise to a seismic trace (e.g., trace 405) that could potentially be tens of minutes or several hours (or days, etc.) in length. In this figure, the trace 405 is shown schematically as containing recorded signals from four different source excitations. Associated with each receiver 310 will be a location on the surface of the earth. When the signals that have been recorded from each receiver 310 are properly arranged and displayed, in the preferred embodiment a 3-D volume will be produced with each receiver 310 being associated with an "X" and a "Y" location, to include locations based on latitude and longitude, etc.

Preferably, during a blended source survey the time at which each source 320 is activated will be noted and recorded, which sources might be located inside or outside of the receiver field. In FIG. 4, $T_1$ and $T_2$ represent the known times (as measured from an arbitrary zero time) at which two sources were activated, with the parameter "N" indicating in a general way the length of time (number of samples) after the source activation during which reflections from the subsurface from this source might be sensed. In this particular example, and as will be explained in greater detail below, the two source activations are from the same source (e.g., two Vibroseis® sweeps) so they do not overlap in time. In this arrangement, interference will most likely come from other seismic sources that were activated during the time window indicated or that had subsurface reflections arriving during this same time interval. That being said, the instant invention would be applied in the same fashion if the two or more source activations from the same source were to overlap in time.

Turning now to a discussion of the mathematical theory of the instant invention, in a first preferred embodiment the blended seismic survey may be represented mathematically by the equation:

$$d = \Gamma S m$$

where d is the recorded data of the sort schematically illustrated in FIG. 4, m is the set of desired reflection signals based on source activations that have been fully separated (i.e, the "model" response), S is a matrix or operator that constrains the solution by requiring similarity between the nearby shots, and $\Gamma$ is the blending or mixing matrix which describes the activation times of the individual sources. In some preferred embodiments the gamma matrix will consist of zeros and ones that are situated so as to introduce each shot into its appropriate time-location in the data matrix d. Note that S can be any method of constraining the events in nearby shots to be similar or coherent. S is not limited to applications in a single direction but is intended to be applied to the full dimensionality of the acquired data (e.g., 2-D, 3-D, 4-D, etc.). Further, it should not be assumed from the previous equation that S is necessarily a linear operator. Although in some preferred embodiments it will be, in other instances this variable will represent a non-linear operator, or a linearized version of same.

In a preferred embodiment, S represents a fast Fourier transform ("FFT"). For irregularly spaced shots, S might better be calculated with discrete Fourier transforms or some other method that allows for the irregular sampling of the shots. Those of ordinary skill in the art will understand how such transforms are calculated. A closely related approach to the preferred embodiment would be for S to represent a curvelet transform. As will be understood by those of ordinary skill in the art, the thresholding operation would then be applied to the curvelet coefficients (rather than to the Fourier coefficients as is done in the Fourier transform approach).

In another preferred embodiment, there is provided an invention substantially as described above, but wherein a different equation is inverted in order to separate the blended sources. In this variation, the equation presented above will be left multiplied by gamma transpose to yield:

$$\Gamma d = \Gamma \Gamma S m$$

One advantage of this approach is that data that contains blended sources are often received at the processing center in the form of combed data, where the term "combed data" should be understood to mean data that have been extracted from a continuous recording and organized into shots.

In another preferred embodiment, the blended seismic survey may be represented mathematically by the equation:

$$W d = W \Gamma S m$$

where d, m, S, and $\Gamma$ have the same meanings as were indicated previously, and where the matrix W is an arbitrary weight matrix. One possible use for the matrix W might be to provide a systematic means of dealing with amplitude variations within the survey. For example, in FIG. 3 receivers 310 that are located proximate to a shot 320 will tend to have higher amplitude signals than signals recorded by trances that are located further away. The W matrix could be used to correct for proximity of the shot to the receiver and to create equal or near equal amplitude traces. Of course, if W is chosen to be an identity matrix, the unweighted system of equations presented previously will be obtained.

Generally speaking, weights and constraints may be useful in improving the quality of the results or in speeding the rate of convergence. For example, requiring the solution to be zero above the time of the first arrivals of a source activation is a natural constraint that might be introduced.

Figure 9:
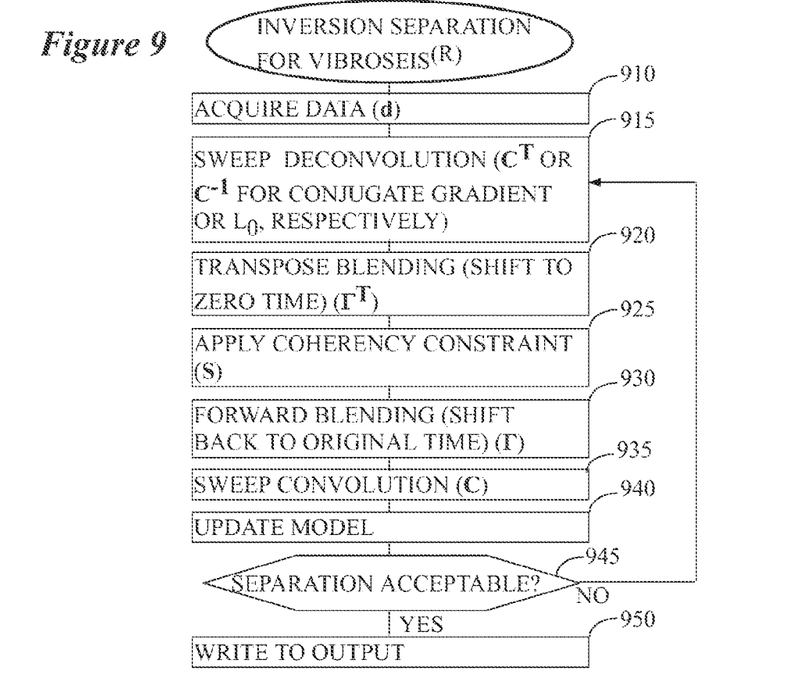
FIG. 9 contains a preferred operating logic that would be suitable for use when the source is vibratory.
Figure 10:
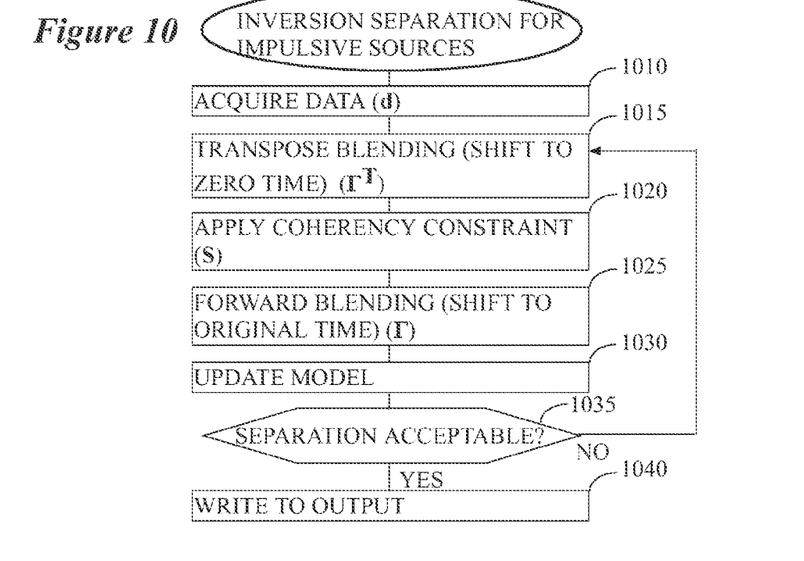
FIG. 10 illustrates a detailed preferred operating logic that would be suitable for use when the source is impulsive.

FIGS. 9 and 10 contain high-level operating logic for preferred embodiments of the instant invention. FIG. 9 illustrates a preferred logic that would be suitable for use when the sources for a blended survey are seismic vibrators (e.g., a Vibroseis® survey). As is indicated in this figure, as a first preferred step 910 the data will be acquired using vibrating sources according to methods discussed elsewhere. The resulting blended data set will then preferably be deconvolved to remove the source signature/sweep signal from the traces (step 915). Although cross correlation is conventionally used to remove the source signature from the recorded seismic data, deconvolution is preferred by the instant inventor because of its tendency to preserve seismic amplitudes more faithfully. That being said, those of ordinary skill in the art will recognize that cross correlation of the vibrator pilot signal with the recorded seismic data could certainly be used instead. Additionally, it should be noted that the instant invention could be practiced without removing the source signature (i.e., treating the data as impulsive as in FIG. 10). However, in that case the source signature would likely be removed from the separated shots after convergence is obtained as part of the usual processing sequence for vibrator data.

Next, and preferably, the selected shots will be shifted to zero time (step 920) via the use of the gamma matrix. This may readily be done by reference to the known activation time of each source that was recorded during the survey. Note, of course, that this time shift (and the other time shifts discussed elsewhere herein) is not a required step of the instant algorithm but is done for purposes of computational convenience only. That being said, it is certainly preferred that the traces be extracted and relocated (or otherwise flagged as being relocated) to a true zero time for the selected shot and, thereafter, shifted back to their actual time of acquisition as represented by their presence in the field records.

Next, a coherency constraint will preferably be applied (step 925). In the preferred embodiment, and as is described in greater detail below, this will involve a one or more dimension Fourier transform, application of a threshold to the resulting Fourier coefficients, and inverse transform as is described in connection with FIG. 8 steps 820, 840, and 855 infra. That being said, there are many alternative ways of imposing such a coherency constraint including, without limitation, application of an FX deconvolution, slant stack, curvelets, etc. Generally speaking, the purpose of this step is to enhance the coherent signal within the traces at the expense of the incoherent noise, with the reflections associated with the selected shot likely being the largest amplitude coherent events in the traces.

Next, and preferably, the processed version of each selected shot will be shifted back to its original time and recombined with the others (step 930) assuming, of course, that the optional time shift of step (915) was performed. Additionally, and this would certainly be preferred in the case of a vibrator source, the sweep signal will be convolved with the previously deconvolved data. Additionally, it is preferred that the model for the selected shots will be updated (step 940) using, for example, least squares or conjugate gradient methods as is discussed below in connection with step 885.

If the separation of the shots is acceptable (the "Yes" branch of decision item 945) the instant method will preferably write the separated shots to output (step 950). Otherwise, the previous steps will preferably be repeated as is indicated in FIG. 9 until the separation is acceptable. Note that for purposes of the instant disclosure, the term "single source gather" will be used herein to refer to a source excitation (shot, vibrator, air gun, etc.) that has been at least approximately separated from a blended source gather according to the methods taught herein.

Turning next to FIG. 10, a similar procedure will preferably be followed when the seismic sources are impulsive (e.g. dynamite or data acquired and correlated with a single common Vibroseis sweep on land, or air guns off shore, etc.). As before, a first preferred step would be to acquire a blended source survey (step 1010). Next, the selected shots will preferably be shifted to zero time (step 1015). Next, and preferably, a coherence constraint (step 1020) will be applied to the data as is discussed in greater detail below. Next, the selected shots will preferably be shifted back to their original time and combined together (i.e., the shots will be forward blended—step 1025). The model will then preferably be updated (step 1030) and the preceding process repeated if the separation of the shots is not acceptable (decision item 1035). Otherwise, the separated shots will preferably be written to output (step 1040).

Figure 8:
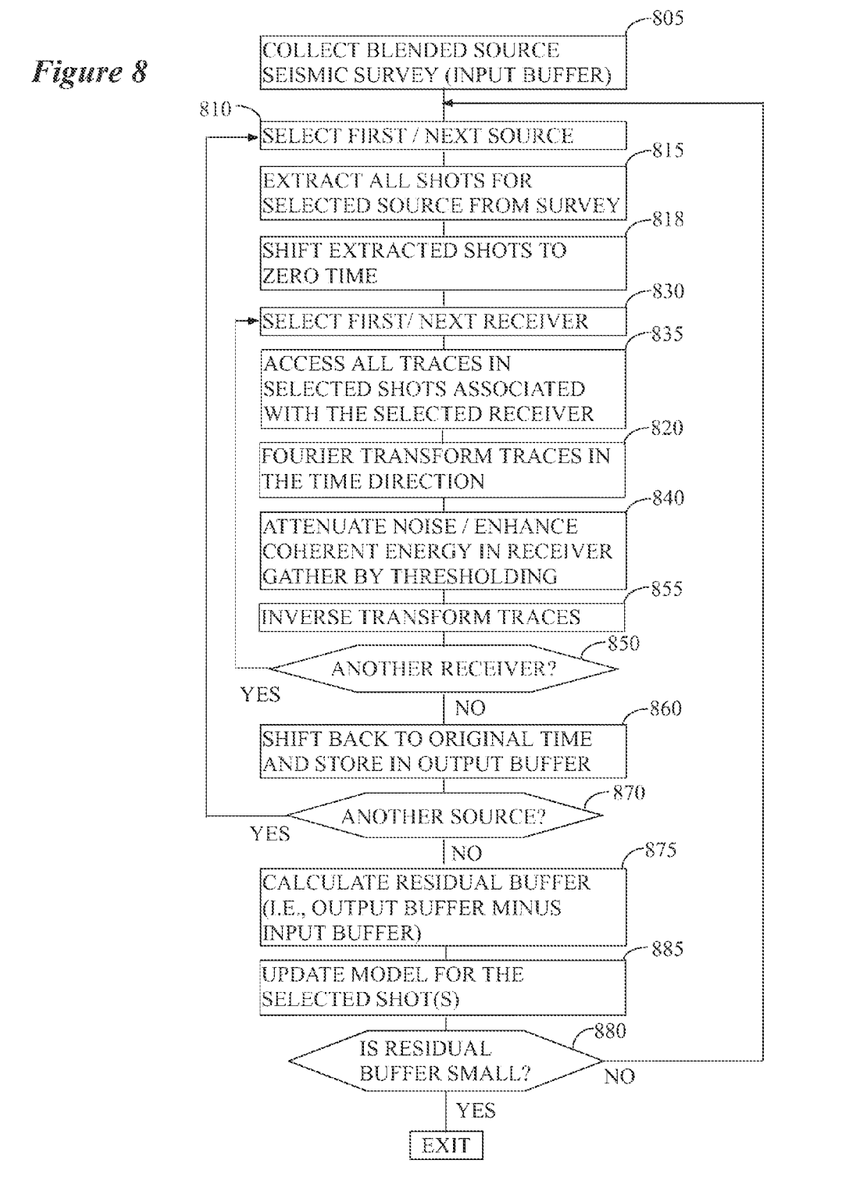
FIG. 8 contains a flowchart of a preferred embodiment of the instant invention.

FIG. 8 contains a more detailed logic suitable for use with the instant invention. A preferred embodiment of the instant invention begins with the collection of a blended source seismic survey according to the procedures discussed previously. That being said, it should be noted and remembered that there are many ways to design and collect a blended source survey and the examples given above should be not used to limit the range of application of the instant invention. All that is required is that the recorded seismic data contain at least two source activations that have returning reflections (or surface waves, etc.) that overlap in time. Preferably, at least two different sources (e.g., two different vibrators, etc.) will be used for purposes of data collection efficiency. Also, note that the instant method is directly applicable to marine surveys as well. For example, the different sources could be pulled by different boats which all fire into the same geophone streamers. Alternatively, a single source could fire shots in rapid succession, etc. The blended source input data—which is initially assigned to the "input buffer" of FIG. 8 (step 805)—may be conceptualized as being similar to the 3-D dataset of FIG. 4. Note further that in a preferred embodiment, one single receiver will be processed at a time to reduce computer memory requirements and to allow parallelization of the method over many receivers.

As a next preferred step, one of the sources (e.g., a particular vibrator, air gun, etc.) will be selected (step 810). Note that, after the first pass through the logic of FIG. 8, subsequent passes will select other sources and the seismic traces and receivers associated therewith.

Next, preferably all of the shots associated with the selected source will be extracted from the input buffer (step 815) and shifted to zero time (step 818). FIG. 4 illustrates conceptually how this might be done. As is indicated in that figure, it should be assumed for purposes of illustration that the chosen source was activated twice at nearby locations: once at time $T_1$ and again at time $T_2$. In such a circumstance, preferably a horizontal (time slice) volume of data will be extracted from the survey 400 beginning at time $T_1$ and continuing for a predetermined period of time thereafter (e.g., 10 seconds) which will include "N" samples. Note, of course, that because of moveout the signals corresponding to the same source activation will appear at different times on different traces depending on their distance from the shot, but accommodating such is well within the ability of one of ordinary skill in the art. This step will produce the seismic volume 410.

Continuing with the previous example, a similar operation will then be performed to produce volume 420 which begins at time $T_2$ which, for purposes of illustration, also includes "N" samples. Note, of course, that in reality the time extent (number of samples) of each volume might be different (e.g., if a vibrator used one sweep pattern for one source activation and a longer or shorter sweep for another). That being said, for purposes of illustration only it will be assumed that each volume is "N" samples in duration with N being chosen to include the entirety of the source activation as recorded by receivers located at both near and far offsets. For purposes of clarity in the discussion that follows, these volumes will be referred to as shot gathers or shot records because each contains seismic energy that originates from the selected source excitation. Of course, in a blended source survey energy from other/non-selected source activations would be expected to also be present within each shot gather.

Each shot gather 410/420 will contain a number of individual seismic traces. Further, it should be noted that although only two source activations are shown in FIG. 4, in reality many more such activations would typically be obtained from each source during an actual blended source survey. Finally, note that each of the extracted volumes will typically contain reflections originating from other (non-selected) source activations which will be attenuated via the methods discussed below.

Preferably, as a next step a first or next receiver will be selected (step 830) from among the receivers in the survey (e.g., one of the receivers 310 of FIG. 3), the preferred object being to sequentially process each receiver in the survey in turn.

Figure 5:
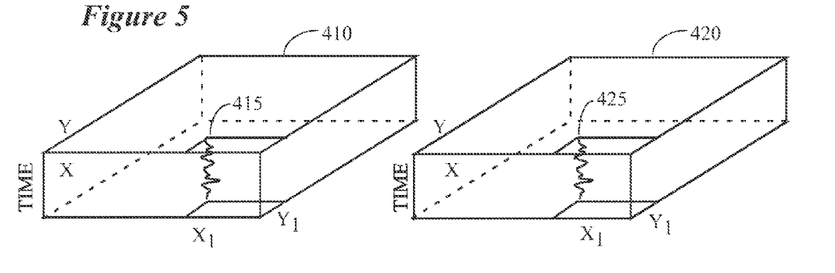
FIG. 5 contains an illustration of how corresponding receiver records may be identified and extracted.

Next, and preferably, all traces in the extracted shot volumes (e.g., shot gathers 410 and 420) that are associated with the chosen receiver will be accessed (step 835). This step is conceptually illustrated in FIG. 5. In this figure, a trace 415 corresponding to the selected receiver $(X_1, Y_1)$ is identified in volume 410 and another trace 425 which was recorded by the same receiver $(X_1, Y_1)$ is identified in volume 420. Preferably the identified traces 415 and 425 will be assembled to form a common receiver gather 610 (see FIG. 6), although those of ordinary skill in the art will recognize that such traces need not be actually be moved together into contiguous memory in order to be operated on as is discussed hereinafter but, instead, might be operated on in place as is often done. Still, the discussion that follows will be made clearer if it is assumed that the traces 415 and 425 have been moved from their original storage location and assembled into a receiver gather 610 as is indicated schematically in FIG. 6.

Next, preferably a coherency constraint will be applied to the selected receiver traces (i.e., steps 820, 840, and 855). Note that, although the preferred coherency constraint involves calculation of a 2D or greater Fourier transform (step 820), thresholding the transform coefficients (step 840), and an inverse Fourier transform (step 855), there are other methods of accomplishing the same end. That is, well known operations such as FX deconvolution, curvelet transformations, slant stack, median stack/filter, principal component analysis, etc., could alternatively be used to enhance the coherency of the selected traces at the expense of incoherent energy such as noise spikes, reflections from non-selected shots, etc. In view of the fact that FX-decon-like methods are relatively fast to compute they are particularly useful as an alternative to thresholding. Those of ordinary skill in the art will readily appreciate that many operations might potentially be performed on the transformed (or untransformed) data to impose a coherency condition on the extracted blended data, the only requirement being that such an operation must tend to reject any energy that is not coherent from trace to trace and tend to preserve coherent energy, and especially preserve coherent energy that is relatively large in amplitude as compared with the noise.

For purposes of the instant disclosure, applying a threshold to a seismic trace should be interpreted to mean comparing all or some of the digital values in the seismic trace with a predetermined value, i.e., the "threshold". Those values that are greater than the threshold will preferably be left unchanged, whereas those that are less than the threshold will preferably be replaced in the trace by zero or some other, preferably small, constant value.

Note that in the preferred embodiment, the threshold applied will preferably be relatively large for the first few iterations (i.e., only relatively large numerical values will be passed unchanged) and will be reduced toward zero as the iteration count increases, thereby allowing more of the Fourier coefficients to pass as the process advances. This allows the strongest and most coherent energy to pass in the early iterations, with the weaker and less coherent energy being passed in later iterations. Preferably, in early iterations the threshold will be chosen such that a very small percentage of the transformed data values will be left unchanged (e.g., a few percent), with the remainder set equal to zero. The final iteration(s) will preferably be performed with the threshold equal to zero so that all Fourier transform values will be passed. In another preferred embodiment the threshold will be set such that about (1-(iter/niter))*100% of the data values are set equal to zero during the "iter" iteration, where "niter" is the projected number of iterations. Thus, if "niter" is 33, then about 97% of the values will be zeroed during the first iteration.

Returning now to step 820, preferably the traces in each extracted receiver volume/gather will be transformed by way of a discrete Fourier transform to produce a Fourier transformed dataset. Typically, this transformation will be implemented via the fast Fourier transform as that term is known to those of ordinary skill in the art. Note that, although an FK transform is preferably used (i.e., a 2D transform), up to a 5-D transform might be used, depending on the coherence criteria that is utilized.

Figure 6:
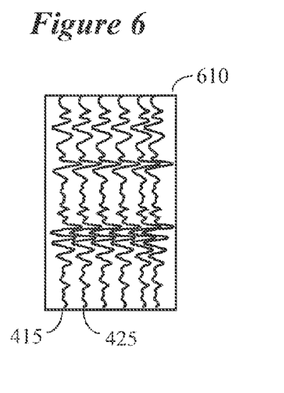
FIG. 6 illustrates a receiver record that is associated with a given source and that has been extracted from its source excitations.

As a next preferred step 840, the coherent energy in receiver gather 610 will be enhanced at the expense of incoherent energy, preferably by thresholding the seismic data as described previously. Note that this step corresponds conceptually to the application of the matrix S in the previous equations.

Preferably, the thresholded data will now be inverse transformed to the time/offset domain (step 855).

Preferably, a determination will next be made as to whether or not this is the last receiver intended for processing (decision item 850) and, if not, the method will branch back to step 830 and repeat the steps that follow.

In the event that all of the receivers in the selected shot have been processed (the "NO" branch of decision item 850), receiver gathers will be (either in effect or actually) reassembled into a volume.

Figure 7:
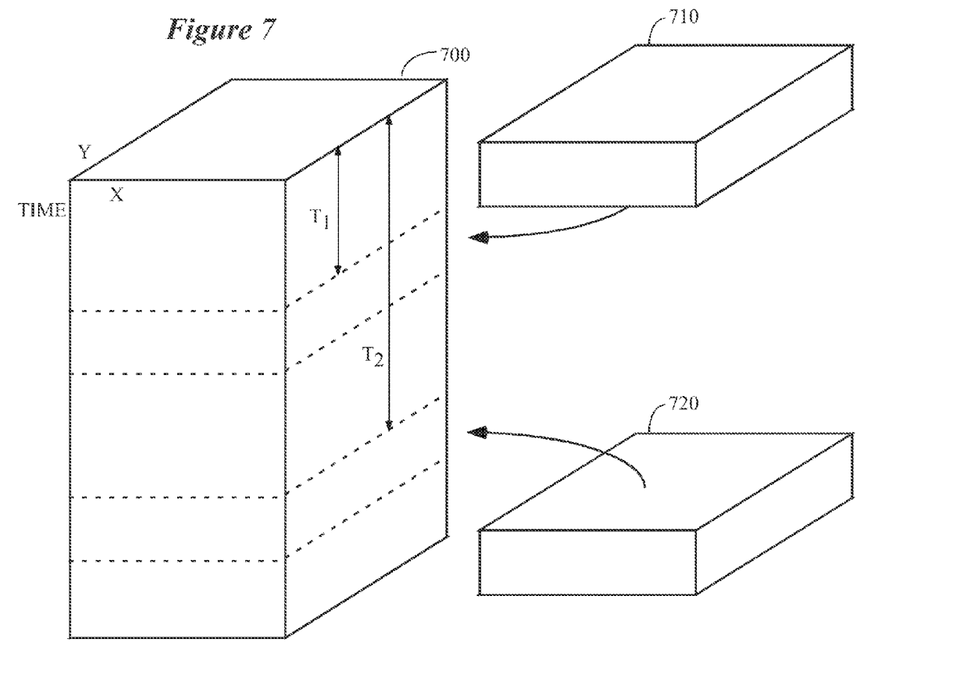
FIG. 7 illustrates schematically how the processed shots for a selected source are shifted in time and stored in the output buffer.

Next, preferably the inverse transformed processed shot records will be time shifted back to their original times (i.e., $T_1$ and $T_2$) and integrated into an output buffer (step 860), preferably via addition thereto. This step corresponds to the application of the gamma matrix ($\Gamma$) in the previous equations and is illustrated conceptually by FIG. 7, wherein an output buffer 700, which will typically be the same dimensions as that of the original seismic survey 400, has been prepared to receive the processed shot records 710 and 720. As should be readily understood by those of ordinary skill in the art, the processed shot records 710 and 720 will preferably be summed into the corresponding traces of the output buffer 700.

Preferably, next a determination will be made as to whether or not there are additional sources that are to be processed (decision item 870). If there are one or more sources to be processed, the instant invention will preferably return to step 810, otherwise the instant invention will preferably move to step 875.

As a next preferred step 875, the instant invention will compare the output buffer to the input buffer, preferably by calculating the difference between the two arrays. In terms of the instant example, the processed data 700 (i.e., the seismic response calculated from the current model estimate) will be subtracted from the input data 400, with the difference between the two matrices being referred to as the "residual", hereinafter (step 875).

Now, if the residual (matrix) is in some sense small (decision item 880), where "small" should be understood to be some sort of numerical measure of the size elements within the matrix, the instant invention will preferably stop and the updated output buffer 700 (step 885) containing the separated shots (m) can then be further processed for use in exploration. In a preferred embodiment the iterations will continue until the residuals are equal to zero or very nearly so.

On the other hand, if the previous steps have not produced a satisfactory separation of the shots, the model will be updated (step 885) and another iteration of the foregoing will preferably be performed. In more particular, it is preferable that a conjugate gradient calculation be performed to improve the estimate contained within the output buffer 700. Those of ordinary skill in the art will recognize how this might be calculated using the input buffer (original survey data), the best estimate of the separated shot matrix, and the residual matrix. Of, course, conjugate gradient is just one of many optimization schemes that might be utilized to update the model matrix. For example, conjugate gradient is essentially an L2 (i.e., least squares) approach and alternative norms (e.g., L1) might similarly be used.

In practice, it has been determined that a few hundred (a preferred number is 270) iterations of steps 810 through 880 often yields a satisfactory separation.

According to another preferred embodiment, there is provided a method substantially similar to that taught above, but wherein an alternative method of attenuating the noise and enhancing the coherent energy in nearby shots is used. In a preferred embodiment, step 840 of FIG. 8 will be performed as follows. Preferably, the traces associated with the selected shot/receiver will be transformed to produce a full 4-D transform. That is, a 2-D horizontal transform will be performed on each frequency slice of the 1D transformed extracted seismic traces, which will yield a 3-D transformed shot volume as is well known in the art. This will preferably be followed by a 1D (horizontal) transformation of each common receiver gather of the sort described and assembled in connection with step 835 (and represented schematically by gather 610 of FIG. 6) which has been formed by taking traces from each of the 3-D transformed shot gathers (i.e., volumes analogous to the shot records 410 and 420). The previous operations will have produced a 4-D transformation of the input data associated with the current source. Similarly, the operation may be extended to 5-D by adding another Fourier transform in the other offset direction. Note that although the instant invention was described in terms of a 2-D horizontal transform window above, preferably either a 2-D or 3-D window will be used depending on the circumstances.

Next, and preferably, the 4-D transformed data will be thresholded in the manner discussed previously. That is, in the preferred arrangement some percentage of the smallest (e.g., in complex magnitude) transformed values will be set equal to zero. Of course, other methods of determining the threshold value (e.g., some percentage of the maximum magnitude in the dataset) could also be used and those of ordinary skill in the art will be readily able to devise same. For example, the threshold could be chosen so that the smallest 90% of the values in the 4-D transformed dataset will equal zero, although those of ordinary skill in the art will recognize that the actual percentage used may need to be adjusted up or down on a case by case basis in order to obtain the best results for a particular survey.

Finally, the thresholded data will be subjected to an inverse 4-D transform to return the data to shot gathers in the (X, Y, time) domain, at which point the instant algorithm will preferably continue with step 850.

Note that the foregoing discussion was most appropriate for use with impulsive source data. Modifying the foregoing to work with vibrator data is straightforward. Returning again to FIG. 8, assume for purposes of illustration that one or more of the sources is a seismic vibrator. In that case, a pilot or similar signal will typically be available for each source excitation (i.e., a sweep). As is well known to those of ordinary skill in the art, it is customary to correlate the pilot signal with the data early in the processing sequence. Within the context of FIG. 8, it is preferred that the pilot signal be removed in conjunction with step 815 or step 818. That is, upon selection of a shot for a given source, the pilot signal associated with that shot will preferably be deconvolved (or similarly removed) from the data.

The instant method will then preferably continue unmodified using the data with the source signature removed until step 860 is reached, at which point the pilot signal will preferably be reintroduced into the data (e.g., via convolution) so that the output buffer will contain data that is comparable with the original data traces.

Those of ordinary skill in the art will recognize that other source-specific signature issues could similarly be resolved by removing the signature as indicated above and reintroducing it later prior to blending the processed shot record back into the output buffer.

Finally, the methods taught herein may be thought of as broadly encompassing two approaches: a constructive approach and a deconstructive approach. In the "constructive" approach, the instant method preferably builds the separated seismic signal frequency-by-frequency. In the "deconstructive version" the starting point will preferably be the full (blended) dataset and interfering noise is successively removed until only the fully separated model data remains.

Using the variable definitions presented previously, a preferred minimal operating logic for the constructive version ("Version A") may be expressed be as follows:
(i) m=0
(ii) dp=0
(iii) dr=d−dp
(iv) mp=Γ'dr
(v) m=m+mp
(vi) m'=FFT(m)
(vii) mp'=threshold(m')
(viii) mp=FFT$^{-1}$(mp')
(ix) dp=Γmp
(x) If more iterations are needed, go to (iii).

Similarly, a preferred minimal operating logic for the deconstructive version ("Version B") may be written as follows:
(i) m=0
(ii) d=recorded data
(iii) dm=Γ'd
(iv) dm'=FFT(dm)
(v) mp'=threshold(dm')
(vi) mp=FFT$^{-1}$(mp')
(vii) dp=Γmp
(viii) d=d−dp
(ix) m=m+mp
(x) If more iterations are needed, go to (iii),
where the definitions of these matrices are the same as those presented previously.

It should be noted that Version A supra tends to resemble a POCS (i.e., "projection onto convex sets") interpolation in that it constructs the desired output m by iteratively fitting the model m to the data d. Version B is similar, but could also be compared to anti-leakage Fourier transform interpolation in that it deconstructs the recorded data d into the model m until d is zero. Version A might possibly be more robust than Version B since Version A is likely to be more self-correcting. But Version B might allow better separation since it applies the coherency criteria to the residual model instead of the total model. Version B is likely to require computation in double precision, especially when many iterations are needed.

CONCLUSION

While the conjugate-gradient inversion method taught above is a preferred approach, inversion methods may also be used. In particular, a POCS (Projection Onto Convex Sets) method may be used instead, making the method look more like a signal-processing technique. The constraint that the data from nearby sources should be similar would be one of the constraints required by the POCS method. In other preferred embodiments, a steepest descent or similar gradient descent algorithm could be used in place of conjugate gradient.

Those of ordinary skill in the art will recognize that conjugate gradient (or Weiner-Levinson) methods are L2 in nature. This immediately suggests that it might be useful in some circumstances to minimize an L1 or other norm instead. It is well known, for example, that iteratively reweighted least squares ("IRLS") provides an algorithm for calculating an L1 (or other robust) norm solution to a minimization problem and such might seem preferred in the instant case. However, experience has shown that an L1 approach to solving the inversion equations that is calculated via IRLS may not always give the best result. Using a projection on convex sets ("POCS") approach to obtaining a solution that approaches an L0 solution might be a better way to calculate this quantity in at least some circumstances.

Although the instant invention preferably inverts the survey data by solving a system of equations of the form d=ΓSm, in some preferred embodiments a different approach to separating the source excitations might be taken. For example, in one preferred embodiment the equations solved will be:

$$d=(\Gamma)m, \text{ and,}$$

$$0=(S')m,$$

where d is, as before, the blended survey data, Γ is the blending matrix, and S' is a coherency criteria that passes the incoherent part of m, and m is the desired separated data. Although this is not the preferred approach, solving for m will yield the sought-after inverted/separated data.

As further alternatives to the methods of filtering to improve the coherency in the data suggested above, those of ordinary skill in the art will recognize that various Radon transforms, PEFs (i.e., prediction error filters), KL filtering, wavelets, curvelets, seislets, SVDs (i.e., singular value decomposition), are other well known methods of enhancing coherent events that might be used instead of thresholding. In some preferred embodiments the coherency computations will be modified to predict the expected kinematics of m. For example S could be formulated as a dip filter to enhance the separation of energy coming from the front and from that coming from the back of a cable, or the energy coming from one side of a cable from that coming from another side, etc.

The matrix S will typically be a 2-D filter that is applied in the common trace (receiver) or common offset domains, which is typically a 2-D collection of traces. In this case, interference will appear as noisy traces in a 2-D dataset. However, if S is configured to be a 3-D filter/matrix, such interference will appear as planes in a 3-D volume, rather than the spikes in the 2-D volume. In a 4-D volume, S will exhibit 3-D interference within a 4-D volume, and so on for 5-D or higher.

In 2-D and 3-D coherency calculations, the interference will likely be limited to individual traces within the volume, and this interference typically will appear as high-amplitude points within the 2-D or 3-D volumes, with the reflection signals of interest appearing as lines in a 2-D volume and planes in a 3-D volume. In the 4-D case points become lines in the 4-D volumes and the reflected signals appear as 3-D volumes within the 4-dimensional volume. In the 5-D case, the interference noise would be generally expected to appear as planes within the 5-D volume and the reflection signals will take the form of 3-D volumes within the 5-D volume. This ratio of the dimensionality of the noise to the signal may not improve after three dimensions, although in a particular instance (depending on the data, survey parameters, etc.) higher dimensional coherency calculations might be beneficial.

Calculating a preferred dimensionality of S will depend on the ratio of interference noise to signal, which will depend, in turn, on the size of the data volume and the configuration of the noise inside this volume. Typically the higher dimension volume will enhance the sparseness of the signal to be separated, but practical concerns (computability and volume size) may limit the applicability of the instant invention when used with the highest dimensions available. The form of S may become a compromise involving signal-to-noise ratio, sampling, and survey geometry.

To reduce the likelihood that interference from a shot does not generate coherent events in a set of shots being considered, sources are preferably activated at random times with respect to each other. When the seismic records are corrected for each source's zero time (i.e., activation time), the reflections related to that source will tend to be coherent, but the energy from interfering sources will tend to be incoherent (i.e., the reflections will not line up) since the delay between shots is random. Of course, there may be a need to review the data collected using random start times to avoid those instances where spurious coherency is produced by accident.

Marine sources that have random time delays of about a few hundred milliseconds may not require continuous recording, although continuous sampling does simplify the problem. An easy method of handling this case would be to have a fixed length of the output records that would be the maximum record length recorded minus the maximum delay time. The data would not be completely predicted, but the prediction at the times of interest should be good. As long as the times of the shots are recorded, the continuous recording, or at least the part of it involved in the inversion, can be reconstructed, although the output record length would be limited to the record length stated above.

Marine towed streamer surveys are likely to have random time delays limited to less than a second or so, as opposed to the more general form of simultaneous source acquisition where each shot may be at random times. Since marine surveys would tend to not have very strong signals overlapping with very weak signals, the data in the later part of the record could be scaled up to improve the convergence of the inversion. That is, since the preferred inversion works from the highest amplitude events to the lowest amplitude, the shallow reflections would be separated in the first iterations, and the weak amplitudes on the deeper reflections would be separated in later iterations. Scaling up the deep data would allow both shallow and deep reflectors to be separated simultaneously. Methods of implementing such scaling are, of course, well known to those of ordinary skill in the art.

In the case of continuous recording, there is no natural limit to the trace length that can be extracted from the continuously recorded data. An interesting aspect of this is that a single source could fire more often. In the marine case, assuming that the airguns could be pressured up fast enough, source activations could, for example, be set off every three seconds, but the trace length extracted might be six seconds or more. Assuming that the data so-recorded can be effectively separated as discussed herein, this approach would allow for closer shot spacings while maintaining the speed of the boats.

With respect to 4-D (time-lapse) surveys in particular, the instant invention allows the explorationist to balance length of a seismic record in time and the cost of having more time between shots. Obtaining low noise data is especially important in 4-D surveys, where the goal may be to identify very subtle changes in the subsurface reflectivity by comparing earlier surveys with later ones. When each survey has noise added from the previous shots, this noise will tend to appear within in the difference measurements and can mask the often very weak time-lapse measurements. That being said, in some circumstances, it is possible that the data extracted from a simultaneous source survey might be cleaner than that obtained from a traditional single-source survey, and that is especially true where time over which the separation is calculated is lengthened. In general, it should be noted that all practical seismic acquisition is actually simultaneous source acquisition, but shortcuts are taken and assumptions about the strength of the noise are made when the data are not processed as simultaneous sources.

Still further, interference that is caused where multiple (unrelated) seismic crews are operating in the same area at the same time is a troublesome issue. Cooperation between such crews—which typically are under the control of competing interests—inevitably means downtime for one crew while the other is shooting. However, when viewed from the standpoint of the instant invention, such unscheduled shots can potentially be removed as has been taught herein so long as they can be can be identified as to their precise location (coordinates) and time of source activation. Given those two parameters (and possibly a source signature as well), it would be possible to separate and remove signals corresponding to the foreign crews' shots as has been described previously. The process of doing so would proceed generally according to logic of FIG. 8, with the times and locations of the third party shots being used to compute actual arrival times on each seismic trace (e.g., for use in step 818) according to methods well known to those of ordinary skill in the art.

Although the large distances and limited directionality of the interfering shots will tend limit the usefulness of the separated data, in some instances such energy could actually prove to be useful and could provide long offset data for use in imaging, velocity determination, etc. Finally, note that it might be acceptable to the parties involved to exchange the shot coordinates and time information because such data would not necessarily give much insight into the ultimate target of the survey. Further, all parties involved would benefited by a shortened time in the field, which again argues for making this sort of exchange.

Additionally it should be noted that when operations are to be performed on traces of a particular type (e.g., a shot gather), it is normally not necessary to bring those seismic traces together in memory (e.g., via a sort) in order to apply multi-trace processes to them. Thus, in the disclosure above and the claims that follow, when it is said that a gather (e.g., shot gather, receiver gather, etc) is assembled or accessed for further processing, those words should be interpreted in their broadest sense to cover instances where the traces that comprise the gather are processed in place or on the fly. Thus, no sorting or other arranging of the data may necessarily be required.

Further, in some preferred embodiments the instant invention will be adapted for use with a VSP, checkshot, or similar downhole survey. By way of explanation, those of ordinary skill in the art will understand that VSP acquisition can be very expensive in terms of rig down time. Shooting faster VSPs with overlapping sources could be used to significantly reduce the costs of such surveys. Thus, when the phrase "blended seismic survey" is used herein, that phrase should be broadly interpreted to include both land and marine 2D and 3-D surveys as well as VSPs, cross hole surveys, etc.

Those of ordinary skill in the art will recognize that although the preferred embodiment utilizes a standard sine and cosine based Fourier transform (and its associated transform and/or spectral values), that is not an absolute requirement. Indeed, there are any number of basis functions that could be used instead. All that is required is that the seismic data be expressible in terms of the coefficients of that function. For example, in some variations, instead of a Fourier-based frequency analysis, some other function might be used (e.g., Walsh transforms, wavelet transforms, Radon transform, etc.). Those of ordinary skill in the art will readily see how these coefficients could be used for purposes of noise attenuation in the same manner as the Fourier coefficients discussed previously. Thus, when the terms "frequency spectrum", "amplitude spectrum", or "Fourier components" are used herein, those terms should be broadly construed to include any collection of coefficients from a discrete transform (orthonormal or otherwise) that can be used to at least approximately reconstruct the seismic data from which the transform was calculated.

Further, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, VSP data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces, transformations by discrete orthonormal transforms, instantaneous phase data traces, instantaneous frequency data traces, quadrature traces, analytic traces, etc. In short, the process disclosed herein can potentially be applied to a wide variety of types of geophysical time series, but it is preferably applied to a collection of spatially related time series.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration above a region of the subsurface containing structural or stratigraphic features conductive to the presence, migration, or accumulation of hydrocarbons, wherein is provided a blended source seismic survey containing at least two interfering seismic source excitations therein, comprising the steps of:
   (a) within a computer, accessing at least a portion of said blended source seismic survey;
   (b) selecting one of said at least two interfering seismic source excitations;
   (c) obtaining at least a time of activation and location coordinates for said selected one of said at least two interfering seismic source excitations;
   (d) using at least said time of activation and said location coordinates for said selected one of said at least two interfering seismic source excitations, separating said selected source excitation from said at least two interfering seismic source excitations using sparse inversion, thereby producing at least one single source gather; and
   (e) using said at least one single source gather to explore for hydrocarbons within said region of the subsurface.

2. The method of seismic exploration according to claim 1, wherein said at least two interfering seismic source excitations are created by a same seismic source.

3. The method of seismic exploration according to claim 1, wherein there is a time interval between each of said at least two interfering seismic source excitations and wherein said time interval is a random time interval.

4. The method of claim 1, wherein step (d) comprises the step of:
   (d1) performing at least steps (b), (c), and (d) a plurality of times for a plurality of different source excitations, thereby producing a plurality of single source gathers, and,
   and wherein step (e) comprises the step of:
   (e1) using said plurality of single source gathers to explore for hydrocarbons within said region of the subsurface.

5. The method of claim 1, wherein step (d) comprises the steps of:
   (d1) using at least said time of activation and said location coordinates for said selected one of said at least two interfering seismic source excitations to separate said selected source excitation from said at least two interfering seismic source excitations using sparse inversion by solving the equation:

$$d = \Gamma Sm,$$

for the matrix m thereby producing a single source gather, where
   m is said single source gather,
   d is a matrix representation of the recorded seismic data,
   S is a matrix or operator that describes the similarity between nearby shots, and
   $\Gamma$ is a matrix that defines the blending or mixing of the individual sources.

6. The method of claim 1, wherein step (d) comprises the steps of:
   (d1) using at least said time of activation and said location coordinates for said selected one of said at least two interfering seismic source excitations to separate said selected source excitation from said at least two interfering seismic source excitations using sparse inversion by solving the equation:

$$Wd = W\Gamma Sm,$$

for the matrix m thereby producing a single source gather, where
   m is said single source gather,
   d is a matrix representation of the recorded seismic data,
   S is a matrix or operator that describes the similarity between nearby shots,
   $\Gamma$ is a matrix that defines the blending or mixing of the individual sources, and,
   W is a known matrix of weights.

7. A method of collecting marine seismic data seismic above a region of the subsurface containing structural or stratigraphic features conducive to the presence, migration, or accumulation of hydrocarbons, comprising the steps of:
   (a) selecting a plurality of shot locations;

(b) activating a first source proximate to a first one of said plurality of shot locations;

(c) activating a second source proximate to a second one of said plurality of shot locations at an interval of time after said first source activation, said interval of time being at least approximately a random interval of time and said interval of time being short enough that said first source activation and said second source activation interfere;

(d) recording said first source activation and said second source activation through at least one seismic receiver;

(e) performing steps (b) and (c) a plurality of times, thereby acquiring a blended source seismic survey, said blended source seismic survey containing at least two interfering seismic source excitations therein;

(f) within a computer, accessing at least a portion of said blended source seismic survey;

(g) selecting one of said at least two interfering seismic source excitations;

(h) separating said selected source excitation from said at least two interfering seismic source excitations using sparse inversion, thereby producing a single source gather; and (i) using said single source gather to explore for hydrocarbons within said region of the subsurface.

8. The method of seismic exploration according to claim 7, wherein said first source and said second source are a same seismic source.

9. The method of seismic exploration according to claim 7, wherein said first one of said plurality of shot locations and said second one of said plurality of shot locations are a same shot location.

10. The method of claim 7, wherein step (h) comprises the steps of:

(h) separating said selected source excitation from said at least two interfering seismic source excitations by solving the equation:

$$d = \Gamma Sm,$$

for the matrix m thereby producing a single source gather, where m is said single source gather, d is a matrix representation of the recorded seismic data, S is a matrix or operator that describes the similarity between nearby shots, and $\Gamma$ is a matrix that defines the blending or mixing of the individual sources.

11. The method of claim 7, wherein step (h) comprises the steps of:

(h1) using at least said time of activation and said location coordinates for said selected one of said at least two interfering seismic source excitations to separate said selected source excitation from said at least two interfering seismic source excitations using sparse inversion by solving the equation:

$$Wd = W\Gamma Sm,$$

for the matrix m thereby producing a single source gather, where m is said single source gather, d is a matrix representation of the recorded seismic data, S is a matrix or operator that describes the similarity between nearby shots, $\Gamma$ is a matrix that defines the blending or mixing of the individual sources, and, W is a known matrix of weights.

12. A system for seismic exploration above a region of the subsurface containing structural or stratigraphic features conducive to the presence, migration, or accumulation of hydrocarbons, wherein is provided a blended source seismic survey containing at least two interfering seismic source excitations therein, the system comprising:

one or more memory devices storing instructions; and one or more processors coupled to the one or more memory devices and configured to execute the instructions to perform a method comprising the steps of:

(a) accessing at least a portion of said blended source seismic survey;

(b) selecting one of said at least two interfering seismic source excitations;

(c) obtaining at least a time of activation and location coordinates for said selected one of said at least two interfering seismic source excitations;

(d) using at least said time of activation and said location coordinates for said selected one of said at least two interfering seismic source excitations, separating said selected source excitation from said at least two interfering seismic source excitations using sparse inversion, thereby producing at least one single source gather; and (e) using said at least one single source gather to explore for hydrocarbons within said region of the subsurface.

13. The system according to claim 12, wherein said at least two interfering seismic source excitations are created by a same seismic source.

14. The system according to claim 12, wherein there is a time interval between each of said at least two interfering seismic source excitations and wherein said time interval is a random time interval.

15. The system according to claim 12, wherein step (d) comprises the step of:

(d1) performing at least steps (b), (c), and (d) a plurality of times for a plurality of different source excitations, thereby producing a plurality of single source gathers, and, and wherein step (e) comprises the step of:

(e1) using said plurality of single source gathers to explore for hydrocarbons within said region of the subsurface.

16. The system according to claim 12, wherein step (d) comprises the steps of:

(d1) using at least said time of activation and said location coordinates for said selected one of said at least two interfering seismic source excitations to separate said selected source excitation from said at least two interfering seismic source excitations using sparse inversion by solving the equation:

$$d = \Gamma Sm,$$

for the matrix m thereby producing a single source gather, where m is said single source gather, d is a matrix representation of the recorded seismic data, S is a matrix or operator that describes the similarity between nearby shots, and $\Gamma$ is a matrix that defines the blending or mixing of the individual sources.

17. The system according to claim 12, wherein step (d) comprises the steps of:

(d1) using at least said time of activation and said location coordinates for said selected one of said at least two interfering seismic source excitations to separate said selected source excitation from said at least two interfering seismic source excitations using sparse inversion by solving the equation:

$$Wd = W\Gamma Sm,$$

for the matrix m thereby producing a single source gather, where m is said single source gather, d is a matrix representation of the recorded seismic data, S is a matrix or operator that describes the similarity between nearby shots, $\Gamma$ is a matrix that defines the blending or mixing of the individual sources, and, W is a known matrix of weights.

18. A non-transitory computer readable medium comprising instructions for causing one or more processors to perform a method for seismic exploration above a region of the subsurface containing structural or stratigraphic features conducive to the presence, migration, or accumulation of hydrocarbons, wherein is provided a blended source seismic survey containing at least two interfering seismic source excitations therein, the method comprising the steps of:

(a) accessing at least a portion of said blended source seismic survey;

(b) selecting one of said at least two interfering seismic source excitations;

(c) obtaining at least a time of activation and location coordinates for said selected one of said at least two interfering seismic source excitations;

(d) using at least said time of activation and said location coordinates for said selected one of said at least two interfering seismic source excitations, separating said selected source excitation from said at least two interfering seismic source excitations using sparse inversion, thereby producing at least one single source gather; and (e) using said at least one single source gather to explore for hydrocarbons within said region of the subsurface.

19. The non-transitory computer readable medium according to claim 18, wherein step (d) comprises the steps of:

(d1) using at least said time of activation and said location coordinates for said selected one of said at least two interfering seismic source excitations to separate said selected source excitation from said at least two interfering seismic source excitations using sparse inversion by solving the equation:

$d = \Gamma S m,$ for the matrix m thereby producing a single source gather, where m is said single source gather, d is a matrix representation of the recorded seismic data, S is a matrix or operator that describes the similarity between nearby shots, and $\Gamma$ is a matrix that defines the blending or mixing of the individual sources.

20. The non-transitory computer readable medium according to claim 18, wherein step (d) comprises the steps of:

(d1) using at least said time of activation and said location coordinates for said selected one of said at least two interfering seismic source excitations to separate said selected source excitation from said at least two interfering seismic source excitations using sparse inversion by solving the equation:

$W d = W \Gamma S m,$ for the matrix m thereby producing a single source gather, where m is said single source gather, d is a matrix representation of the recorded seismic data, S is a matrix or operator that describes the similarity between nearby shots, $\Gamma$ is a matrix that defines the blending or mixing of the individual sources, and, W is a known matrix of weights.

\* \* \* \* \*